(12) United States Patent
Soulodre

(10) Patent No.: US 8,180,067 B2
(45) Date of Patent: May 15, 2012

(54) SYSTEM FOR SELECTIVELY EXTRACTING COMPONENTS OF AN AUDIO INPUT SIGNAL

(75) Inventor: Gilbert Arthur Joseph Soulodre, Ottawa (CA)

(73) Assignee: Harman International Industries, Incorporated, Northridge, CA (US)

( * ) Notice: Subject to any disclaimer, the term of this patent is extended or adjusted under 35 U.S.C. 154(b) by 1602 days.

(21) Appl. No.: 11/412,784

(22) Filed: Apr. 28, 2006

(65) Prior Publication Data

US 2007/0253574 A1    Nov. 1, 2007

(51) Int. Cl.
*H04R 3/00* (2006.01)
*H04B 15/00* (2006.01)
(52) U.S. Cl. .................................. 381/92; 381/94.3
(58) Field of Classification Search .............. 381/92, 381/94.2, 94.3, 94.7, 94.1; 704/233, 226, 704/227
See application file for complete search history.

(56) References Cited

U.S. PATENT DOCUMENTS

| | | | |
|---|---|---|---|
| 4,066,842 A | 1/1978 | Allen | 179/1 P |
| 4,118,599 A | 10/1978 | Iwahara et al. | 179/1 G |
| 4,159,397 A | 6/1979 | Iwahara et al. | 179/1 GQ |
| 4,829,574 A | 5/1989 | Dewhurst et al. | 381/41 |
| 4,912,767 A | 3/1990 | Chang | 381/47 |
| 5,068,897 A | 11/1991 | Yamato et al. | 381/24 |
| 5,210,366 A | 5/1993 | Sykes | 84/616 |
| 5,210,802 A | 5/1993 | Aylward | 381/61 |
| 5,285,503 A | 2/1994 | Satoh et al. | 381/109 |
| 5,303,307 A * | 4/1994 | Elko et al. | 381/92 |
| 5,305,386 A | 4/1994 | Yamato | 381/1 |
| 5,386,478 A | 1/1995 | Plunkett | 381/103 |
| 5,394,472 A | 2/1995 | Broadie | 381/1 |
| 5,440,639 A | 8/1995 | Suzuki et al. | 381/17 |
| 5,491,754 A | 2/1996 | Jot et al. | 381/63 |
| 5,511,129 A | 4/1996 | Craven et al. | 381/103 |
| 5,568,558 A | 10/1996 | Ramm et al. | 381/94 |
| 5,579,396 A | 11/1996 | Iida et al. | 381/18 |
| 5,581,618 A | 12/1996 | Satoh et al. | 381/17 |
| 5,710,818 A | 1/1998 | Yamato et al. | 381/1 |

(Continued)

FOREIGN PATENT DOCUMENTS

EP    0 989 543 A2    3/2000

(Continued)

OTHER PUBLICATIONS

F. J. Harris, "On the Use of Windows for Harmonic Analysis with the Discrete Fourier Transform," Proc. IEEE, vol. 6, No. 1, Jan. 1978, pp. 51-83.*

(Continued)

*Primary Examiner* — Vivian Chin
*Assistant Examiner* — Kile Blair
(74) *Attorney, Agent, or Firm* — Brinks Hofer Gilson & Lione

(57) ABSTRACT

An apparatus for selectively extracting components of an input signal comprises a plurality of microphones for detecting an audio signal in a plurality of spaced locations. A plurality of signal samplers sample each spaced version of the audio signal. A microphone pattern processor derives a reference signal, a null signal and a core signal from the sampled signals. An adjustment frequency spectrum generator coupled to the null and reference signals generates an adjustment frequency spectrum signal that is applied to the core signal. An audio signal regenerator provides an output audio signal from the adjusted core signal. The apparatus can be used in a wireless device to pick up a speaker's voice in a noisy environment.

30 Claims, 4 Drawing Sheets

U.S. PATENT DOCUMENTS

| | | | |
|---|---|---|---|
| 5,742,689 A | 4/1998 | Tucker et al. | 381/17 |
| 5,754,663 A | 5/1998 | Goldfarb | 381/82 |
| 5,761,315 A | 6/1998 | Iida et al. | 381/18 |
| 5,822,438 A | 10/1998 | Sekine et al. | 381/17 |
| 5,848,163 A | 12/1998 | Gopalakrishman et al. | 381/56 |
| 6,052,470 A | 4/2000 | Mouri | 381/18 |
| 6,111,962 A | 8/2000 | Akio | 381/63 |
| 6,122,382 A | 9/2000 | Iida et al. | 381/18 |
| 6,243,322 B1 | 6/2001 | Zakarauskas | 367/127 |
| 6,366,679 B1 | 4/2002 | Steffen et al. | 381/356 |
| 6,385,320 B1 | 5/2002 | Lee | 381/17 |
| 6,522,756 B1* | 2/2003 | Maisano et al. | 381/92 |
| 6,549,630 B1* | 4/2003 | Bobisuthi | 381/94.7 |
| 6,584,203 B2* | 6/2003 | Elko et al. | 381/92 |
| 6,625,587 B1 | 9/2003 | Erten et al. | 706/22 |
| 6,674,865 B1 | 1/2004 | Venkatesh et al. | 381/107 |
| 6,691,073 B1 | 2/2004 | Erten et al. | 702/190 |
| 6,754,623 B2 | 6/2004 | Deligne et al. | 704/233 |
| 6,850,621 B2 | 2/2005 | Sotome et al. | 381/17 |
| 6,937,737 B2 | 8/2005 | Polk, Jr. | 381/300 |
| 6,947,570 B2* | 9/2005 | Maisano | 381/313 |
| 6,956,954 B1 | 10/2005 | Takemura et al. | 381/307 |
| 7,003,119 B1 | 2/2006 | Arthur | 381/17 |
| 7,020,291 B2 | 3/2006 | Buck et al. | 381/92 |
| 7,039,197 B1 | 5/2006 | Venkatesh et al. | 381/86 |
| 7,065,416 B2 | 6/2006 | Weare et al. | 700/94 |
| 7,076,068 B2 | 7/2006 | Sotome et al. | 381/17 |
| 7,082,201 B2 | 7/2006 | Sotome et al. | 381/17 |
| 7,095,455 B2 | 8/2006 | Jordan et al. | 348/734 |
| 7,095,865 B2 | 8/2006 | Katayama et al. | 381/309 |
| 7,099,480 B2 | 8/2006 | Willems | 381/18 |
| 7,113,609 B1 | 9/2006 | Neidich et al. | 381/305 |
| 7,113,610 B1 | 9/2006 | Chrysanthakopoulos | 381/309 |
| 7,123,731 B2 | 10/2006 | Cohen et al. | 381/303 |
| 7,167,566 B1 | 1/2007 | Bauck | 381/17 |
| 7,171,003 B1 | 1/2007 | Venkatesh et al. | 381/66 |
| 7,177,432 B2 | 2/2007 | Eid et al. | 381/22 |
| 7,206,413 B2 | 4/2007 | Eid et al. | 381/22 |
| 7,231,053 B2 | 6/2007 | Polk, Jr. | 381/300 |
| 7,242,782 B1 | 7/2007 | Kasai et al. | 381/92 |
| 7,266,501 B2 | 9/2007 | Saunders et al. | 704/500 |
| 7,330,557 B2* | 2/2008 | Fischer et al. | 381/313 |
| 7,881,480 B2 | 2/2011 | Buck et al. | 381/94.1 |
| 8,036,767 B2 | 10/2011 | Soulodre | 700/94 |
| 2001/0036286 A1 | 11/2001 | Layton et al. | 381/304 |
| 2002/0037083 A1 | 3/2002 | Weare et al. | 381/58 |
| 2002/0037084 A1 | 3/2002 | Kakuhari et al. | 381/98 |
| 2002/0039425 A1 | 4/2002 | Burnett et al. | 381/94.7 |
| 2002/0159103 A1 | 10/2002 | Ford et al. | 381/103 |
| 2003/0007648 A1 | 1/2003 | Currell | 381/61 |
| 2003/0045953 A1 | 3/2003 | Weare | 700/94 |
| 2003/0061032 A1 | 3/2003 | Gonopolskiy | 704/200.1 |
| 2003/0072460 A1 | 4/2003 | Gonopolskiy et al. | 381/92 |
| 2003/0128848 A1 | 7/2003 | Burnett | 381/71.8 |
| 2003/0135377 A1 | 7/2003 | Kurianski et al. | 704/500 |
| 2003/0169887 A1 | 9/2003 | Fujita et al. | 381/63 |
| 2003/0174845 A1 | 9/2003 | Hagiwara | 381/17 |
| 2003/0223603 A1 | 12/2003 | Beckman | 381/310 |
| 2004/0066940 A1 | 4/2004 | Amir | 381/94.2 |
| 2004/0223620 A1 | 11/2004 | Horbach et al. | 381/59 |
| 2004/0228498 A1 | 11/2004 | Sekine | 381/303 |
| 2004/0240697 A1 | 12/2004 | Keele, Jr. | 381/336 |
| 2004/0258255 A1* | 12/2004 | Zhang et al. | 381/92 |
| 2005/0053249 A1 | 3/2005 | Wu et al. | 381/310 |
| 2005/0069143 A1 | 3/2005 | Budnikov et al. | 381/63 |
| 2005/0129249 A1 | 6/2005 | Chabanne | 381/17 |
| 2005/0195984 A1 | 9/2005 | Miura et al. | 381/63 |
| 2005/0220312 A1 | 10/2005 | Kasai et al. | 381/97 |
| 2005/0232440 A1* | 10/2005 | Roovers | 381/92 |
| 2005/0249356 A1 | 11/2005 | Holmi et al. | 381/86 |
| 2005/0281408 A1 | 12/2005 | Kim et al. | 381/17 |
| 2005/0286727 A1 | 12/2005 | Otsuka | 381/18 |
| 2006/0039567 A1 | 2/2006 | Huang | 381/22 |
| 2006/0045275 A1 | 3/2006 | Daniel | 381/17 |
| 2006/0045294 A1 | 3/2006 | Smyth | 381/309 |
| 2006/0062410 A1 | 3/2006 | Kim et al. | 381/310 |
| 2006/0088175 A1 | 4/2006 | Eid et al. | 381/104 |
| 2006/0098830 A1 | 5/2006 | Roeder et al. | 381/310 |
| 2006/0109992 A1 | 5/2006 | Roeder et al. | 381/310 |
| 2006/0126878 A1 | 6/2006 | Takumai et al. | 381/335 |
| 2006/0171547 A1 | 8/2006 | Lokki et al. | 381/92 |
| 2006/0222182 A1 | 10/2006 | Nakaishi et al. | 381/27 |
| 2006/0222184 A1 | 10/2006 | Buck et al. | 381/71.1 |
| 2006/0233382 A1 | 10/2006 | Watanabe | 381/56 |
| 2006/0256978 A1 | 11/2006 | Balan et al. | 381/94.7 |
| 2006/0269071 A1 | 11/2006 | Nakano | 381/17 |
| 2006/0274902 A1 | 12/2006 | Hume et al. | 381/17 |
| 2006/0280311 A1 | 12/2006 | Beckinger et al. | 381/17 |
| 2006/0280323 A1 | 12/2006 | Neidich et al. | 381/300 |
| 2007/0014417 A1 | 1/2007 | Fujita et al. | 381/17 |
| 2007/0019816 A1 | 1/2007 | Konagai | 381/59 |
| 2007/0036366 A1 | 2/2007 | Konagai et al. | 381/61 |
| 2007/0047743 A1* | 3/2007 | Taenzer et al. | 381/92 |
| 2007/0064954 A1 | 3/2007 | Booth et al. | 381/58 |
| 2007/0110250 A1 | 5/2007 | Bauck | 381/20 |
| 2007/0110268 A1 | 5/2007 | Konagai et al. | 381/335 |
| 2007/0129952 A1 | 6/2007 | Kenyon et al. | 704/500 |
| 2007/0154020 A1 | 7/2007 | Katayama | 381/17 |
| 2007/0230725 A1 | 10/2007 | Wang | 381/309 |
| 2008/0069366 A1 | 3/2008 | Soulodre | 257/700 |
| 2008/0232603 A1 | 9/2008 | Soulodre | 381/63 |
| 2008/0232617 A1 | 9/2008 | Goodwin et al. | 381/307 |
| 2008/0260175 A1* | 10/2008 | Elko | 381/73.1 |
| 2011/0081024 A1 | 4/2011 | Soulodre | 381/17 |

FOREIGN PATENT DOCUMENTS

| | | |
|---|---|---|
| JP | 2005-073082 | 3/1993 |
| JP | 2003-005770 | 1/2003 |
| JP | 2003-263178 | 9/2003 |
| JP | 2003-271165 | 9/2003 |
| WO | WO 01/76319 A1 | 10/2001 |
| WO | WO 01/76319 A2 | 10/2001 |
| WO | WO 2006/006809 A1 | 1/2006 |

OTHER PUBLICATIONS

Eargle, John. The Microphone Book. Focal Press, 2004. pp. 50-90.*

Wang, David L., Lim, Jae S., The Unimportance of Phase in Speech Enhancement, IEEE Transactions on Acoustics, Speech, and Signal Processing, vol. ASSP-30, No. 4, Aug. 1982, 3 pgs.

Griesinger, David, "Practical Processors and Programs for Digital Reverberation," *Proceedings of the AES 7th International Conference, Audio Engineering Society*, Toronto, May 1989, pp. 187-195, (11 pgs.).

Griesinger, David, "Spaciousness and Envelopment in Musical Acoustics," *Presented at the 101st Convention of the Audio Engineering Society*, Los Angeles, Nov. 8-11, 1996, Preprint #4401, 13 pages.

Griesinger, David, "General Overivew of Spatial Impression, Envelopment, Localization, and Externalization," *Proceedings of the 15th International Conference of the Audio Engineering Society on Small Room Acoustics*, Denmark, Oct. 31-Nov. 2, 1998, pp. 136-149, (15 pgs.).

Griesinger, David, "Improving Room Acoustics Through Time Variant Synthetic Reverberation," *Presented at the 90th Convention of the Audio Engineering Society*, Paris, Feb. 1991, reprint #3014, 15 pgs.

Griesinger, David, "Room Impression Reverberance and Warmth in Rooms and Halls," *Presented at the 93rd Convention of the Audio Engineering Society*, San Francisco, Nov. 1992, Preprint #3383, 8 pages.

Griesinger, David, "Measures of Spatial Impression and Reverberance based on the Physiology of Human Hearing," Proceedings of the 11th International Audio Engineering Society Conference, May 1992, pp. 114-145, (33 pgs.).

Griesinger, David, "Multichannel Sound Systems and Their Interaction with the Room," *Presented at the 15th International Conference of the Audio Engineering Society*, Copenhagen, Oct. 1998, pp. 159-173, (16 pgs.).

Griesinger, David, "How Loud is My Reverberation?," *Presented at the 98th Convention of the Audio Engineering Society*, Paris, Feb. 1995, 7 pages.

Griesinger, David, "Spaciousness and Localization in Listening Rooms and Their Effects on the Recording Technique," *J. Audio Eng. Soc.*, vol. 34, No. 4, 1986, pp. 255-268, (16 pgs.).

Griesinger, David, "The Psychoacoustics of Apparent Source Width, Spaciousness, and Envelopment in Performance Spaces," *Acta Acoustics*, vol. 83, 1997, pp. 721-731, (11 pgs.).

Griesinger, David, "The Theory and Practice of Perceptual Modeling—How To Use Electronic Reverberation to Add Depth and Envelopment Without Reducing Clarity," material from David Griesinger's Internet Home Page, obtained from the Internet at: <www.world.std.com/~griesngr . . . >, undated but prior to May 2002, 28 pgs.

Griesinger, David, "Internet Home Page," obtained from the Internet at: <www.world.std.com/~griesnger/>, printed on Apr. 26, 2004, (9 pgs.).

Allen, J.B. et al., Multimicrophone Signal-Processing Technique to Remove Room Reverberation From Speech Signals, Oct. 1977, pp. 912-915, vol. 62, No. 4, Acoustical Society of America.

Tsoukalas, Dionysis E. et al., Speech Enhancement Based on Audible Noise Suppression, Nov. 1997, pp. 497-512, vol. 5, No. 6, IEEE.

Bradley, John S. et al., The Influence of Late Arriving Energy on Spatial Impression, Apr. 1995, pp. 2263-2271, Acoustical Society of America.

Widrow, Bernard et al., Adaptive Noise Cancelling: Principles and Applications, Dec. 1975, pp. 1692-1717, vol. 63, No. 12, IEEE.

Ramarapu, Pavan K. et al., Methods for Reducing Audible Artifacts in a Wavelet-Based Broad-Band Denoising System, Mar. 1998, pp. 178-190, vol. 46, No. 3, Audio Engineering Society.

Sambur, Marvin R., Adaptive Noise Canceling for Speech Signals, Oct. 1978, pp. 419-423, vol. ASSP-26, No. 5, IEEE.

Thiede, Thilo et al., PEAQ- The ITU Standard for Objective Measurement of Perceived Audio Quality, Jan.Feb. 2000, pp. 3-29, vol. 48, No. ½, Audio Engineering Society.

Johnston, James D., Transform Coding of Audio Signals Using Perceptual Noise Criteria, Feb. 1998, pp. 314-323, vol. 6, No. 2, IEEE.

Todd, Craig C. et al., AC-3: Flexible Perceptual Coding for Audio Transmission and Storage, $96^{th}$ Convention Feb. 26-Mar. 1, 1994, pp. 1-17, AES.

Levine, Scott N., A Switched Parametric and Transform Audio Coder, 1999, pp. 1-4, ICASSP, Phoenix, Arizona.

Julia Jakka, "Binaural to Multichannel Audio Upmix", Helsinki University of Technology, Jun. 6, 2005.

Wu et al. "A One-Microphone Approach for Reverberant Speech Enhancement", 2003 IEEE International Conference on Acoustics, Speech and Signal Processing, pp. 1-844 to 1-847, Apr. 6-10, 2003, Hong Kong.

Baskind et al. "Pitch-Tracking of Reverberant Sounds, Application to Spatial Description of Sound Scenes", AES $24^{th}$ International Conference—Multichannel Audio: The New Reality, Jun. 26-28, 2003, Banff, Alberta, Canada.

Theile, Gunther "Wave Field Synthesis—a Promising Spatial Audio Rendering Concept", Proc. F the $7^{th}$ Int. Conference on Digital Audio Efects, Oct. 5-8, 2004, pp. 125-132.

U.S. Appl. No. 13/270,022, filed Oct. 10, 2011, Gilbert Arthur Joseph Soulodre, entitled System for Extraction of Reverberant Content of an Audio Signal.

* cited by examiner

SYSTEM FOR SELECTIVELY EXTRACTING COMPONENTS OF AN AUDIO INPUT SIGNAL

FIELD OF THE INVENTION

This invention relates to the decomposition and alteration of select components of an input signal and more particularly to reducing or increasing the perceptibility of a component of an input signal. It has particular application to increasing or reducing a component of an audio signal.

In general almost any audio signal can be described as the sum of one or more desired signals, plus one or more noise sources, plus any reverberation associated with each of these desired signals and noise sources. In many situations, the relative mixture of these various components of the signal is not suitable for a given application. We therefore seek a means of altering the mixture of components in order to make the signal more suitable to the application. In many cases we would like to be able to extract a desired signal while suppressing the remaining components of the signal.

BACKGROUND OF THE INVENTION

In general any audio signal can be described as the sum of one or more desired signals, plus one or more noise sources, plus any reverberation associated with each of these desired signals and noise sources. For example, consider a person talking in a room with a radio playing, as well as other noise sources such as a computer or an air conditioning unit. If we place a microphone at some location in the room we will capture a mixture of all of the sound sources in the room. In many situations, the relative mixture of these various components of the signal is not suitable for a given application. However, once the sound sources have been mixed together and picked-up by the microphone, it is extremely difficult to extract a desired signal while suppressing the other sound sources. We therefore seek a means of altering the mixture of the components in order to make the signal more suitable to the application.

There are many situations where it is desirable to be able to extract a desired audio signal from a mixture of audio signals. In the above scenario we may wish to be able to isolate the sound of the talker while removing the other sounds as well as the reverberation. For example, in surveillance and security applications it is desirable to be able to isolate the sound of the talker in order to increase the intelligibility of what is being said. One way to better isolate the talker's voice is to somehow place the microphone closer to talker, however, this may not be practical or possible in many cases. Another approach is to use a directional microphone. Directional microphones are more sensitive to sounds arriving from some directions versus other directions. A highly directional (shotgun) microphone or an array of microphones can be used to zoom-in on the desired talker (and extract his voice) from a distance. While this can work very well in certain situations, these types of microphones tend to be large and bulky, and therefore not easily concealed. Therefore, it is desirable to have a system that provides the same signal extraction capabilities as a highly directional microphone but can be very small in size. Most microphones are not able to adequately separate sounds that are arriving from nearby sound sources versus those due to sound sources that are further away from the microphone. It is desirable to have a system that is able to select or suppress sound sources based on their distance from the microphone.

Moving-picture cameras such as camcorders record sound along with the image. This also applies to some security and surveillance cameras, as well as to certain still-picture cameras. In most cameras the user can adjust the amount of optical zoom in order to focus the image onto the desired target. It is desirable to also have a corresponding audio zoom that would pick up only the sound sources associated with the image. Some cameras do offer this ability by employing a microphone system with variable directivity but, unless the system is rather large in size, it may be very limited in the degree to which it can zoom-in. Therefore, such systems are often inadequate in their ability to select the desired sounds while rejecting unwanted sounds. Also, these microphone systems can be very susceptible to wind noise, causing the recorded signal to become distorted. It is desirable to have a small audio zoom system that matches the abilities of the optical zoom, thereby eliminating unwanted sounds and reducing reverberation. It is also desirable for this system to reduce the noise due to the camera itself.

In hearing aids, sounds are picked up by a microphone and the resulting signal is then highly amplified and played into the user's ear. One common problem with hearing aids is that they do not discriminate between the desired signal and other sound sources. In this case noise sources are also highly amplified into the user's ear. To partially alleviate this problem some hearing aids include a noise reduction circuit based on a signal processing method known as spectral subtraction. Typically such noise reduction circuits are only effective at removing steady noises such as an air conditioner, and do not work well at suppressing noises that are dynamically changing. A key limitation of the spectral subtraction noise reduction method is that it often distorts the desired signal and creates audible artifacts in the noise-reduced signal. Furthermore, while this approach may reduce the perceived loudness of the noise, it does not tend to provide any improvement in speech intelligibility, which is very important to hearing aid users.

Another method used to reduce unwanted noises in hearing aids is to use a directional microphone. In the hearing aid application a microphone with a cardioid directional pattern might be used. The cardioid microphone is less sensitive to sounds arriving from behind as compared to sounds arriving from the front. Therefore, if the hearing aid user is facing the desired sound source then the cardioid microphone will reduce any unwanted sound sources arriving from behind. This will help increase the level of the desired signal relative to the level of the unwanted noise sources. Another advantage of the directional microphone is that it reduces the amount of reverberation that is picked up. Excessive reverberation is known to reduce speech intelligibility. In hearing aids a directional microphone pattern is usually derived by processing the output signals from two omnidirectional (i.e., non-directional) microphones. This limits how selective the directional microphone can be. That is, it is limited in how much it can zoom-in on the desired signal and in how much the unwanted noises can be suppressed in comparison to the desired signal, thereby making this approach less effective in higher noise environments. A more selective directional microphone pattern could be obtained by using more than two omnidirectional microphones; however this is not typically practical due to the physical size limitations of the hearing aid. So, while a directional microphone can be advantageous, its benefit is limited and may not be adequate in many situations. A traditional directional microphone will also tend to amplify the user's own voice into the hearing aid, which is not desirable.

One common problem with traditional directional microphones is that they can be very susceptible to wind noise, causing the desired signal to be distorted and unintelligible.

Another common problem in hearing aids is that of acoustic howling due to the very high amounts of amplification between the microphone and earpiece. This acoustic howling is very disturbing and painful to the hearing aid user. A carefully chosen directional microphone may help mitigate this problem to some extent, but typically some form of adaptive echo canceling circuit is also required. However, such circuits often fail to completely eliminate the acoustic howling.

Therefore, in hearing aid applications we would like a means of selectively amplifying desired signals while suppressing undesired noises and reverberation. The method should be able to suppress all types of unwanted sounds and should have significantly better selectivity than is possible with traditional directional microphones. It would be very helpful if this method could also help to reduce acoustic howling. We would also like the new method to be relatively insensitive to wind noise. Furthermore, we would like a means of suppressing the hearing aid user's own voice.

Headsets are widely used in many applications for two-way voice communications. The headset includes a microphone to pick up and transmit the user's voice. However, there are many situations where the microphone also picks up other sounds, which is undesirable. In call centers there can be numerous operators talking in close proximity to each other, and the microphone can pick up the sound of the other talkers. Headsets are becoming increasingly popular for cell phone use since they allow the user's hands to be free to do other things. The headset can be connected to the cell phone via a wire, or through a wireless technology such as BLUETOOTH. In this application, the headset is used in a broad variety of acoustic environments including, cars, restaurants, outdoors, airports, boats, and offices. These varying acoustic environments introduce various types and levels of noise, as well as reverberation that are picked up by the headset microphone. Two general approaches have traditionally been employed to try to reduce the level of the noise picked up by the headset microphone. One approach is to place the microphone on a boom so that it is positioned as close as possible to the user's mouth. While this approach can help to reduce the level of the noise and reverberation, it may not be adequate in higher noise (or highly reverberant) environments. For example, this approach would not sufficiently remove the noise picked up when the headset is used in a car. Moreover, the boom can be very disturbing to the user. Another approach is to use a traditional directional microphone, which is also inadequate in higher noise environments. Also, the traditional directional microphone is highly susceptible to wind noise making it unusable in many situations.

Adaptive noise canceling microphones have been tried on communications headsets in high-noise environments (such as military or industrial settings). This approach uses two or more microphones and tries to cancel out the background noise while preserving the desired speech signal. This approach is limited to providing about 10 dB of noise reduction, which is not adequate in many situations. It requires knowledge beforehand of the location of the desired speech signal. Due to its adaptive nature, its performance can be variable and has been found to deteriorate in situations where there are multiple noise sources.

The audio quality of cell phones often deteriorates quickly in the presence of background noise. This problem is aggravated by the user's desire to have a cell phone that is as small as possible. The result is that the microphone is located further away from the user's mouth. Directional microphones can be used to help alleviate this problem but they are often inadequate for the task. Spectral subtraction based noise reduction circuits can be used but they often do not provide sufficient noise reduction and can cause annoying artifacts on the processed speech signal. Therefore, there is a need for a system of adequately removing noise and reverberation from the speech signal on cell phones.

So called handsfree phones are often used for conference calls where there are multiple talkers in the same room. Handsfree phones are increasingly being used in cars for safety reasons. One key problem with typical handsfree phones is that they don't only pick up the desired talker, but also various noises and reverberation. In a car application, the level of the noise can be quite severe, and may include wind noise. Also, when there are several talkers in the room or car, the handsfree phone will typically pick up all of the talkers. This may not always be desirable. For example, in the car example, it may be desirable to only pick up the driver's voice. A directional microphone can be used, or the microphone can be placed closer to the talker. However, this may not always be practical or desirable, and in most cases will not sufficiently reduce the noise and reverberation. Another potential problem with handsfree phones is that echo and howling can occur when the sound from loudspeaker is picked up by the microphone. To address these problems an improved method is required for isolating the desired talker's voice while significantly attenuating all other sounds.

Speech signals are frequently processed in many ways. For example in cell phones the speech signal is processed by a sophisticated codec in order to compress the amount of data being transmitted and received over the phone network. Similarly, in VOIP (voice over Internet protocol) applications, speech signals are also compressed by a codec in order to be transmitted over the Internet. In order to maximize the amount of compression while maintaining acceptable audio quality, special codecs are used that are highly tuned to the properties of speech. These codecs work best when the speech signal is relatively free from noise and reverberation. Similarly, the performance of speech recognition (speech-to-text) systems and voice recognition systems (for security purposes) often deteriorates quickly in the presence of background noise and reverberation. These systems are often used in conjunction with a desktop or laptop computer, which can itself be the source of significant noise. To help alleviate these problems, users are often forced to find some way of placing the microphone very close to their mouth. This may not be convenient in many situations, and in highly noisy or reverberant environments this may still be inadequate and so the speech processing system may not work as well as intended. In numerous applications, a method is needed to remove unwanted noises and reverberation in order to clean up the speech signal prior to some further processing.

In karaoke applications, the user sings along to a recording of the instrumental version of the song. Processing is often applied to the singer's voice in order to improve its quality and to correct the singer's pitch. To operate correctly, these processors rely upon having a clean version of the singer's voice. Any leakage of the recorded instruments into the microphone can cause the voice processor to incorrectly process the singer's voice. A directional microphone can be used to help reduce this leakage, but its performance is often inadequate. A better method of capturing the singer's voice while rejecting the recorded instruments is required.

Public address (PA) systems are used to amplify sounds for an audience. PA systems are used in a broad range of applications including churches, live music, karaoke, and for all forms of public gatherings. A PA system works by picking up the desired sound with a microphone and then amplifying that sound through loudspeakers. A common problem with PA systems occurs when the amplified sound is picked up the microphone and then further amplified. This can cause the PA system to become unstable, resulting in very disturbing howling. This problem can be reduced in certain extent by using traditional directional microphones such as a cardioid microphone. However, this may not work in many cases due to the relative placement of the microphone and the loudspeakers. Therefore, the reduction in howling due to a traditional directional microphone is not adequate in many situations. It is highly desirable to have a microphone system that could effectively eliminate howling in all situations.

When making musical recordings of singers and acoustical instruments, traditional directional microphones are frequently used in order to emphasize certain parts of a sound field, suppress certain other parts of a sound field, or control the amount of reverberation that is picked up. This approach is limited since the relative amounts of emphasis, suppression, and reverberation cannot be arbitrarily controlled simultaneously. In general there is a desire to have a microphone system that can arbitrarily emphasize certain parts of a sound field while simultaneously suppressing other parts.

Traditional directional microphones permit sound sources located at specific angles to be suppressed, but they don't do well at separating sound sources that are nearby versus those that are further away. In many of the applications described above it would be extremely beneficial to be able to distinguish between sound sources based on their position and distance with respect to the microphone. Moreover, traditional directional microphones work better at removing a particular sound source, as opposed to extracting and isolating a given source from within a mixture of sounds. In general, there is a need to be able to isolate and separate sounds sources into different signal streams based on their direction and distance. The individual signal streams could then be altered and recombined as desired in order to meet the specific requirements of a given application.

SUMMARY OF THE INVENTION

In accordance with one aspect of this invention, the present invention addresses the above need by providing a method and apparatus that uses two or more microphones, and processes and compares the signals of the two microphones to identify and extract individual sound sources based on their locations. Both reverberation and undesired noise signals received by the microphones are removed in response to a time varying manipulation of the frequency spectra of the signals of the microphones to extract a sound source at a specific location.

The microphone signals manipulated and combined to produce at least three intermediate signals, consisting of at least a Null microphone signal, a Reference microphone signal, and a Core microphone signal. Corresponding frequency bands of the Null microphone signal and the Reference microphone signal are analyzed using a generalized lateral energy fraction measure to indicate the dominant spatial location of the sound source for each frequency band. A spatial filter is applied to the generalized lateral energy fraction values to derive gain values for the frequency bands. The corresponding frequency bands of the Core microphone signal are modified in accordance with the computed gains. The modified frequency bands are combined and transformed to form the desired signal.

The method and apparatus may also include a perceptual model. The purpose of the perceptual model is to determine which portions of the unwanted signal are being masked by the desired signal and which are not. Masking is the phenomenon that occurs in the human auditory system by which a signal that would otherwise be audible is rendered inaudible in the presence of another signal. By including a perceptual model in the processing, only the audible portion of the unwanted signal is removed, and thus the overall modification of the frequencies of the Core microphone signal is further reduced. The perceptual model also provides interactions of internal parameters across time and frequency to reflect the masking properties of the ear. As a result, the artifacts that result from modifying these frequencies are reduced.

The method and apparatus may also include noise reduction processes applied to the Null microphone signal and the Reference microphone signal. The purpose of the noise reduction processes is to provide more accurate generalized lateral energy fraction measurements in the presence of noise or reverberation. A relatively strong and diffuse noise signal will appear in both the Null microphone signal and the Reference microphone signal. This will tend to saturate the generalized lateral energy fraction measure thereby limiting the possible range of the measured values. This will in turn reduce the ability to selectively extract the desired signal. By including the noise reduction processes this saturation is reduced, thus permitting better extraction of the desired signal.

The method and apparatus may also include a noise reduction process applied to the Core microphone signal. The purpose of the noise reduction process is to reduce unwanted sounds from sources that are spatially located near the desired sound source.

The method and apparatus may also include a source model. The purpose of the source model is to provide a model of the acoustic characteristics of the desired sound source. By knowing the acoustic characteristics of the desired sound source, better decisions can be made regarding which portions of the input signals are due to the desired signal and which are due to other undesired sound sources. For example, speech signals have known consistent properties due to the physical nature of how speech sounds are produced. A speech-based source model would exploit this knowledge to determine which portions of the input signals may be due to speech, and which portions cannot be due to a speech source.

In accordance with an aspect of the present invention there is provided a method of selectively extracting components of an input signal comprising the steps of: detecting an audio signal in at least first and second spaced locations; sampling first and second detected signals; deriving a reference signal, a null signal and a core signal from the first and second sampled signals; deriving an adjustment frequency spectrum from the null and reference signals; applying the adjustment frequency spectrum signal to the core signal; and regenerating an audio signal from the adjusted core signal.

In accordance with a further aspect of the present invention there is provided an apparatus for selectively extracting components of an input signal comprising: means for detecting an audio signal in at least first and second spaced locations; means for sampling first and second detected signals; means for deriving a reference signal, a null signal and a core signal from the first and second sampled signals; means for deriving an adjustment frequency spectrum from the null and reference signals; means for applying the adjustment frequency spectrum signal to the core signal; and means for regenerating an audio signal from the adjusted core signal.

In accordance with another aspect of the present invention there is provided an apparatus for selectively extracting components of an input signal comprising: a plurality of microphones for detecting an audio signal in a plurality of spaced locations; a plurality of signal samplers; a microphone pattern processor for deriving a reference signal, a null signal and a core signal from the sampled signals; an adjustment frequency spectrum generator coupled to the null and reference signals for generating an adjustment frequency spectrum signal; an adjustment processor for applying the adjustment frequency spectrum signal to the core signal; and an audio signal regenerator for providing an output audio signal from the adjusted core signal.

DETAILED DESCRIPTION

Figure 1:
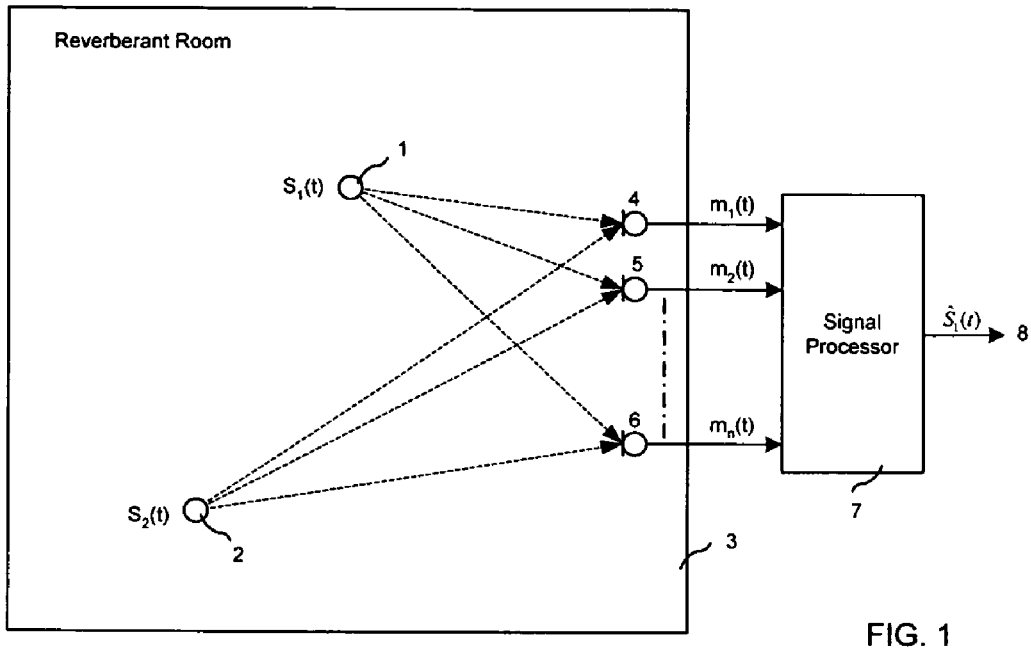
FIG. 1 illustrates two sound sources in a reverberant room with a plurality of separated microphones.
Figure 2:
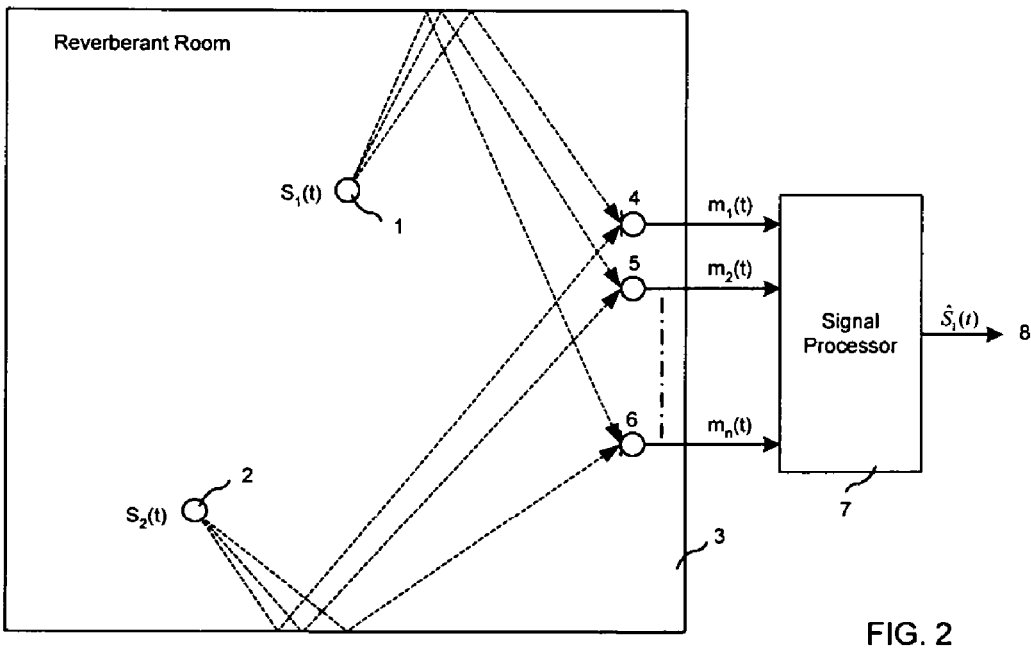
FIG. 2 illustrates reflective paths for the arrangement of FIG. 1.

FIG. 1 shows two sounds sources 1 and 2 in a reverberant room 3 with n somewhat separated microphones, 4, 5, 6, where n>=2. Each microphone outputs a signal $m_1(t)$, $m_2(t)$, ..., $m_n(t)$, which is the combination of the two sound sources as they are transmitted through the room. The parts of the signals at each of the n microphones due to the first sound source 1 are different from one another because of the different spatial locations of the microphones. The distances from the first sound source 1 to the microphones are different, and thus the level of that sound will be different for each microphone signal. The angles between the first sound source 1 and the microphones are different, and thus the time of arrival of the first sound source 1 will be different for each microphone. As shown in FIG. 2, the patterns of reflections off the various surfaces in the room are different for each of the microphone signals. Moreover, for all of the above reasons, the part of the signals at each microphone due to the second sound source 2 will be different from the part due to the first sound source 1.

Each acoustic path of the room between each sound source and each microphone can be viewed as a separate filter. Mathematically, signals $m_1(t)$, $m_2(t)$, ..., $m_n(t)$ may be expressed by, $$m_1(t) = h_{11}(t) * s_1(t) + h_{21}(t) * s_2(t)$$

$$m_2(t) = h_{12}(t) * s_1(t) + h_{22}(t) * s_2(t)$$

$$m_n(t) = h_{1n}(t) * s_1(t) + h_{2n}(t) * s_2(t)$$

where $s_1(t)$ is the signal of the first sound source 1 and $s_2(t)$ is the signal of the second sound source 2. Of course this can be generalized to any number of sound sources. $h_{11}(t)$ is the impulse response of the signal path from the first sound source 1 to the first microphone 4, and the symbol "*" indicates the convolution operator. $h_{21}(t)$ is the impulse response of the signal path from the second sound source 2 to the first microphone 4. In general, $h_{ij}(t)$ is the impulse response of the signal path from sound source i to microphone j.

In general, in an embodiment of the present invention, a signal processor 7 operates on the microphone signals to derive an estimate $\hat{s}(t)$ 8 of a desired signal $s_1(t)$ 1. The embodiment operates on the signals $m_1(t)$, $m_2(t)$, ..., $m_n(t)$, in the frequency domain as described in FIG. 3. Each microphone signal is converted to a frequency domain representation by applying an overlapping analysis window to a block of time samples. The time to frequency domain processor produces an input spectrum in response to input time samples. To achieve time to frequency domain conversion, the time to frequency domain processor may execute a Discrete Fourier Transform (DFT), wavelet transform, or other transform, or may be replaced by or may implement an analysis filter bank. In the preferred embodiment, a DFT is used.

The microphone pattern processor 20 operates on the frequency domain representations of the microphone signals to produce a Null signal spectrum Null($\omega$) 21, a Ref signal spectrum Ref($\omega$) 22, and a Core signal spectrum Core($\omega$) 23. The variable $\omega$ indicates frequency. Generally, the microphone pattern processor operates on the microphone signals to produce a Null($\omega$) signal with a certain desired directional pattern, a Ref($\omega$) signal with a certain desired directional pattern, and a Core($\omega$) signal with a certain desired directional pattern. Generally, the Null($\omega$) signal, the Ref($\omega$) signal, and the Core($\omega$) signal will have different directional patterns. An omnidirectional pattern is included as a possible choice of directional patterns. The Null($\omega$) signal spectrum and the Ref($\omega$) signal spectrum are used in the derivation of the adjustment frequency spectrum, and the Core($\omega$) signal spectrum is operated upon by the adjustment processor 25. The directionalities of the Null($\omega$) signal, the Ref($\omega$) signal, and the Core($\omega$) signal can vary independently with frequency.

It will be understood that, alternatively, any or all of the Null($\omega$), Ref($\omega$), or Core($\omega$) microphone signals can be derived in the time domain and then converted to the frequency domain. The microphones 4, 5, 6, may be omnidirectional or directional, and they may not have the same directional characteristics.

The adjustment processor 25 is operable to adjust frequency components of the Core($\omega$) signal spectrum 23 in response to an adjustment frequency spectrum to produce an output frequency spectrum 26 including adjusted frequency components of the Core($\omega$) signal spectrum.

The frequency to time domain processor 32 is operable to produce an output frame of time samples in response to the output frequency spectrum. The frequency to time domain processor generally performs the inverse function of the time to frequency domain processor 17, 18. Consequently, in the preferred embodiment, the frequency to time domain processor performs an Inverse Discrete Fourier Transform (IDFT).

A first noise reduction processor 24 operates on either or both of the Null($\omega$) 21 signal spectrum and the Ref($\omega$) 22 signal spectrum. The noise-reduced version of the Null($\omega$) signal spectrum is $\widetilde{Null}(\omega)$ 41 and the noise-reduced version of the Ref($\omega$) signal spectrum is $\widetilde{Ref}(\omega)$ 42. $\widetilde{Null}(\omega)$ and $\widetilde{Ref}(\omega)$ are input to the adjustment frequency spectrum generator 30.

Generally, the adjustment frequency spectrum generator 30 derives an adjustment frequency spectrum that will either pass or attenuate a sound source based on its direction of arrival and its distance from the microphone array. The adjustment frequency spectrum generator 30 computes a spatial index measure at 40 for each frequency band. The spatial index measure provides a measure of angle and distance of the dominant sound source within each frequency band. A spatial filter 27 is then applied to the spatial indices to determine the value of the adjustment frequency spectrum for each frequency band.

The spatial filter allows frequency bands having a spatial index within a certain range to pass un-attenuated, by setting the corresponding frequency bands of the adjustment frequency spectrum to a value of 1.0. Frequency bands outside of this range are correspondingly attenuated by setting the corresponding frequency bands of the adjustment frequency spectrum to a value of less than 1.0. The adjustment processor 25 then applies the adjustment frequency spectrum to the Core(ω) signal spectrum 23 to produce a first output signal Y(ω) 26.

Allen, J. B. et al., Multimicrophone Signal-Processing Technique to Remove Room Reverberation From Speech Signals, October 1977, pp. 912-915, Vol. 62, No. 4, Acoustical Society of America. (Allen), describes a method for altering the signals of two separated microphones based on the cross correlation between the two microphone signals. Allen attenuates frequency bands that have low cross correlation with the assumption that this corresponds to the perception of the "late echo" section of the impulse response. The method of Allen does not select or reject sound sources based on angle or distance. A common method for predicting spatial perception in rooms is to use a cross correlation based measure known as the Inter-aural Cross Correlation (IACC). More recent research has shown that spatial perception can be better predicted using a measure based on the lateral energy fraction Bradley, John S. et al., The Influence of Late Arriving Energy on Spatial Impression, April 1995, pp. 2263-2271, Acoustical Society of America, (Bradley and Soulodre). The spatial index measure 40 derived within the adjustment frequency spectrum generator 30 of the present embodiment of the invention uses a mathematical function that is motivated by the lateral energy fraction.

The performance embodiment of the invention may be improved by including a perceptual model 29 in the derivation of the adjustment frequency spectrum. One goal of the perceptual model is to limit the amount by which frequency bands are attenuated, such that an unwanted signal component is only attenuated to the point where it is masked by the desired signal. The performance of the embodiment of the invention may also be improved by including a source model 28 in the derivation of the adjustment frequency spectrum. One goal of the source model is to account for the physical characteristics of the desired sound source when deciding how much a given frequency band should be attenuated. The source model may also account for the physical characteristics of one or more of the undesired sound sources. In practice, aspects of the perceptual model and the source model may be combined.

A second noise reduction processor 31 operates on first output signal Y(ω) to produce the output frequency spectrum $\hat{S}_1(\omega)$ 34. The frequency to time domain processor 32 is operable to produce an output frame of time samples in response to the output frequency spectrum. The frequency to time domain processor generally performs the inverse function of the time to frequency domain processor 17, 18. Consequently, in the preferred embodiment, the frequency to time domain processor performs an Inverse Discrete Fourier Transform (IDFT).

Preferred Embodiment

The following describes a preferred embodiment for picking up and isolating a sound source that is located relatively close to the microphone array. This would be the case in numerous applications including telephones, communications headsets, microphone systems for public address systems, and karaoke microphones.

Figure 4:
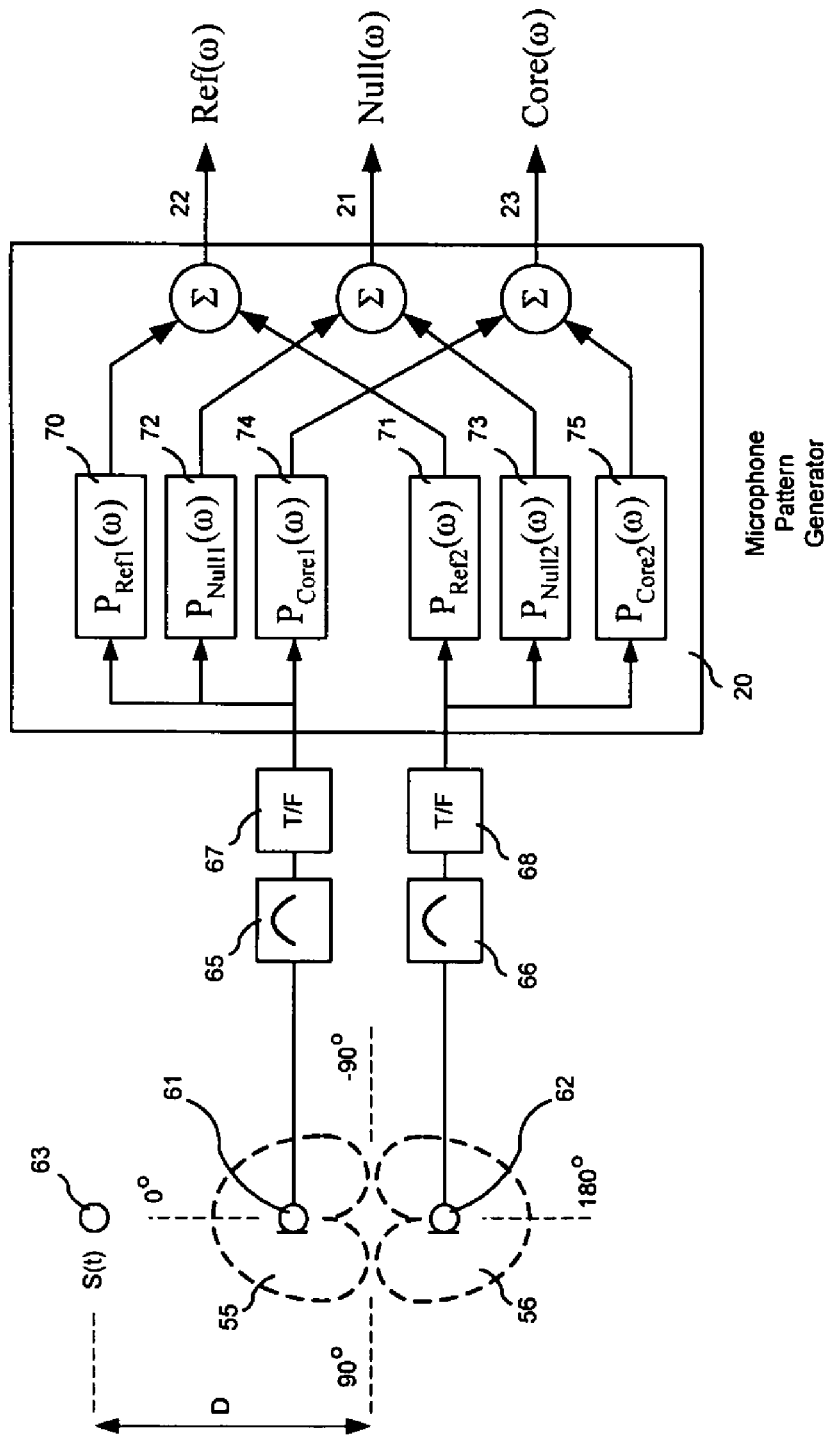
FIG. 4 illustrates an apparatus for selectively extracting components of an input signal in accordance with a further embodiment of the present invention.

In describing this embodiment it is assumed that an array of two microphones, Mic1 61 and Mic2 62 are being used and their placement with respect to the desired sound source s(t) 63 is as shown in FIG. 4. The desired sound source s(t) is located along the axis that passes through Mic1 and Mic2. The direction of s(t) with respect to the microphones will be considered as 0 degrees, and the distance from s(t) to the point midway between Mic1 and Mic2 will be referred to as D. Other undesired sound sources are located at angles other than 0 degrees and/or they are located at some distance other than D.

In this embodiment, the two microphones Mic1 and Mic2 are assumed to be omnidirectional, although it will be appreciated by those skilled in the art that one or both microphones may be directional, and that the two microphones can have different directional properties.

The signals from Mic1 and Mic2 are converted to a frequency domain representation at 67 and 68. In this embodiment a fast implementation of the Discrete Fourier Transform (DFT) is employed with a 50% overlapping root-Hanning window 65, 66. It will be appreciated by those skilled in the art that other frequency domain representations may be employed, including but not limited to the discrete cosine transform or the wavelet transform. Alternatively, a filterbank may be employed to provide a frequency domain representation. It will be further appreciated that other windowing functions may be employed and that the amount of overlapping is not restricted to 50%. The frequency domain representations of the signals at Mic1 and Mic2 are $M_1(\omega)$ and $M_2(\omega)$ respectively.

The microphone pattern processor 20 operates on the frequency domain representations of the microphone signals to produce a Null signal spectrum Null(ω) 21, a Ref signal spectrum Ref(ω) 22, and a Core signal spectrum Core(ω) 23. The microphone pattern processor operates on the microphone signals as shown in FIG. 4 and described mathematically as follows, $$\text{Null}(\omega) = M_1(\omega) \cdot P_{Null1}(\omega) + M_2(\omega) \cdot P_{Null2}(\omega)$$

$$\text{Ref}(\omega) = M_1(\omega) \cdot P_{Ref1}(\omega) + M_2(\omega) \cdot P_{Ref2}(\omega)$$

$$\text{Core}(\omega) = M_1(\omega) \cdot P_{Core1}(\omega) + M_2(\omega) \cdot P_{Core2}(\omega)$$

where $P_{Null1}(\omega)$, $P_{Null2}(\omega)$, $P_{Ref1}(\omega)$, $P_{Ref2}(\omega)$, $P_{Core1}(\omega)$, and $P_{Core2}(\omega)$ are the microphone adjustment frequency spectra, and ω indicates frequency. The various microphone adjustment frequency spectra are complex valued, and so, in general they will affect both the phase and magnitude of the signal with which they are multiplied.

In this embodiment the microphone pattern processor 20 is made to operate on the frequency domain representation of the microphone signals such that the Ref(.omega.) 22 signal corresponds to the signal resulting from a cardioid microphone pattern facing the desired signal s(t) as indicated by 55 of FIG. 4. As such, P.sub.Ref1(.omega.) 70 and P.sub.Ref (.omega.) 71 are designed to provide a delay corresponding to the time that is required for sound to travel the distance between the two microphones.

In this embodiment, the Null(ω) 21 signal corresponds to the signal resulting from a cardioid microphone pattern with the null of the pattern directed toward the desired signal as indicated by 56 in FIG. 4. Since in this embodiment, the desired sound source s(t) is assumed to be close to the microphone array, the level of s(t) at the two microphones will be significantly different. Therefore, $P_{Null1}(\omega)$ 72 and $P_{Null2}(\omega)$ 73 are designed to account for this level difference, as well as provide a delay corresponding to the time that is required for sound to travel the distance between the two microphones. As a result, the Null(ω) 21 signal will contain little or none of s(t).

In this embodiment, the Core(ω) 23 signal corresponds to a figure-of-eight microphone pattern, with the nulls at +/−90 degrees, and so $P_{Core1}(\omega)$ 74 and $P_{Core2}(\omega)$ 75 are designed accordingly.

Figure 3:
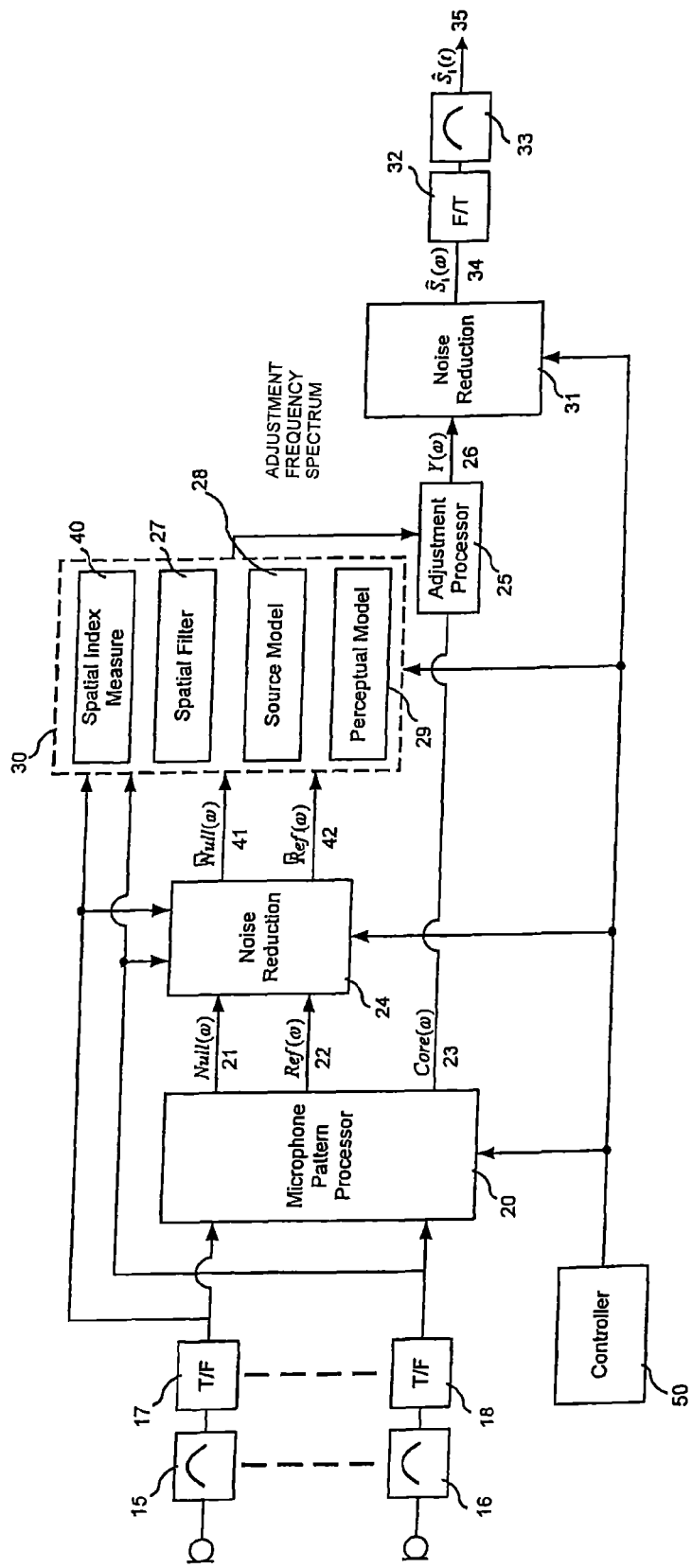
FIG. 3 illustrates an apparatus for selectively extracting components of an input signal in accordance with an embodiment of the present invention.

Ref(ω) and Null(ω) are used to derive a spatial index measure 40 representing the relative locations of the desired and undesired sound sources. However, the values of the spatial index measure may be corrupted by the presence of noise. Therefore, a noise reduction process 24 is applied to the Ref(ω) 22 and Null(ω) 21 signals prior to computing the spatial index measure as shown in FIG. 3. The noise-reduced versions of these signals are denoted as $\mathcal{R}ef(\omega)$ 42 and $\mathcal{N}ull(\omega)$ 41 where $$\mathcal{N}ull(\omega)=\text{NoiseReduction}[\text{Null}(\omega)]$$

$$\mathcal{R}ef(\omega)=\text{NoiseReduction}[\text{Ref}(\omega)]$$

In this embodiment a spectral subtraction based noise reduction process such as described by Tsoukalas, Dionysis E. et al., Speech Enhancement Based on Audible Noise Suppression, November 1997, pp. 497-512, Vol. 5, No. 6, IEEE, (Tsoulakis) or is employed. Also, in this embodiment, the Null(.omega.) signal is used to obtain the noise estimate for deriving (.omega.), and the Ref(.omega.) signal is used to obtain the noise estimate for deriving (.omega.). It will be appreciated that other signals, or a combination of other signals, may be used to obtain the noise estimates. It will be appreciated that other noise reduction methods such as adaptive noise cancellation (ret, wavelet de-noising Ramarapu, Pavan K. and Maher, Robert C., Methods for Reducing Audible Artifacts in a Wavelet-Based Broad-Band Denoising System, March 1998, pp. 178-190, Vol. 46, No. 3, Audio Engineering Society, (Maher), or the method due to Sambur, Marvin R., Adaptive Noise Canceling for Speech Signals, October 1978, pp. 419-423, Vol. ASSP-26, No. 5, IEEE, (Sambur) may be employed.

$\mathcal{R}ef(\omega)$ and $\mathcal{N}ull(\omega)$ are provided to the adjustment frequency spectrum generator 30 to compute the spatial index measure at 40. In computing the spatial index measure, a polarity index Q(ω) is computed for each frequency band.

$$Q(\omega) = \text{sgn}\{|\mathcal{R}ef(\omega)|^2 - |\mathcal{N}ull(\omega)|^2\}$$

where $$\text{sgn}[x] = \begin{cases} 1; & x > 0 \\ 0; & x = 0 \\ -1; & x < 0 \end{cases}$$

In this embodiment, Q(ω) indicates whether the dominant signal in a given frequency band is arriving from the front of the microphone array (|θ|<90°) or the rear of the microphone array (|θ|>90°). Q(ω) will have a value of 1.0 if the sound source is to the front, and will have a value of −1.0 if the sound is to the rear. With this, the spatial index measure Δ(ω) is computed at 40 as follows;

$$\Delta(\omega) = \frac{Q(\omega) \cdot |\mathcal{R}ef(\omega) - \mathcal{N}ull(\omega)|^2}{\alpha(\omega) \cdot |\mathcal{R}ef(\omega)|^2 + \beta(\omega) \cdot |\mathcal{N}ull(\omega)|^2}$$

Figure 5:
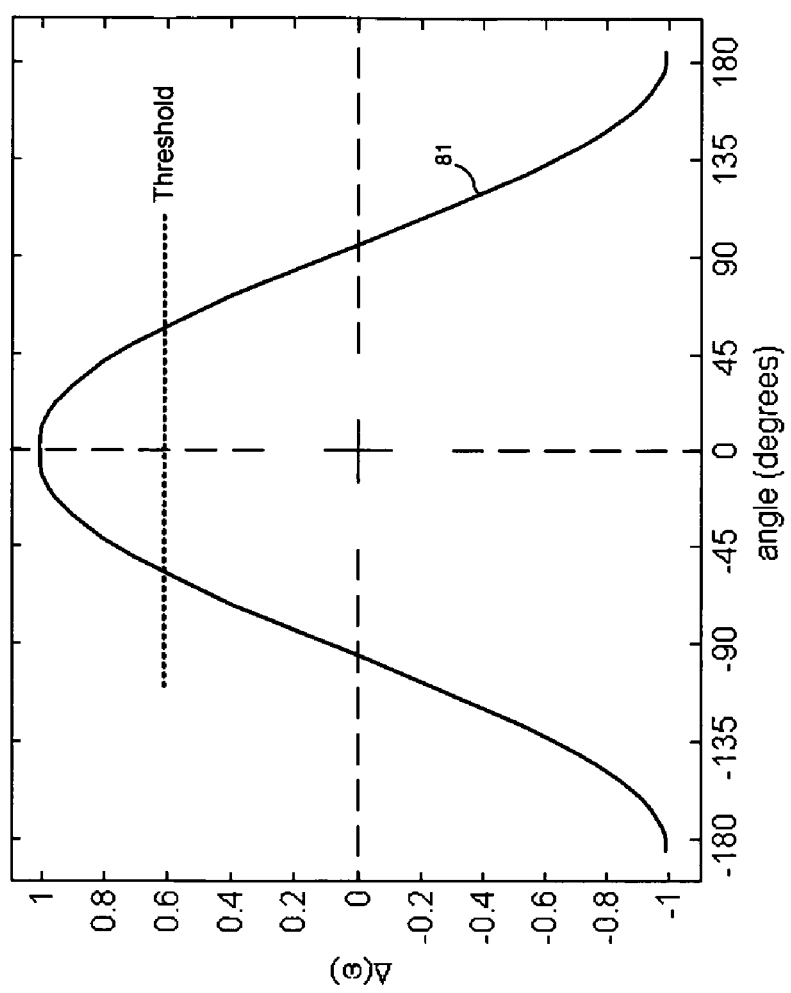
FIG. 5 graphically illustrates an exemplary form of the spatial index of the embodiment of FIG. 4.

The spatial index measure in this embodiment has a form similar to the curve 81 in FIG. 5. α(ω) and β(ω) are real values that may vary with frequency. They serve to alter the shape of the curve 81 in FIG. 5.

For each frequency band, a spatial filter 27 is applied to the spatial index measure in order to select certain signal components and suppress other components. The spatial filter provides an initial gain value G(ω) for each frequency band.

$$G(\omega)=\text{SpatialFilter}[\Delta(\omega)]$$

The adjustment processor 25 later operates on the Core(ω) signal by applying a refined version of the gain values G(ω)). The values of the adjustment frequency spectrum correspond to these refined gain values. In this embodiment the spatial filter consists of setting G(ω) equal to 1.0 if Δ(ω) is greater than 1.0, and setting G(ω) to some value Threshold if Δ(ω) is less than Threshold. Otherwise, G(ω) is set to be equal to Δ(ω).

$$G(\omega) = \begin{cases} 1.0; & \Delta(\omega) > 1.0 \\ \Delta(\omega); & \text{otherwise} \\ \text{Threshold}; & \Delta(\omega) < \text{Threshold} \end{cases}$$

The values of G(ω) are further refined by employing a perceptual model 29 and a source model 28. The perceptual model accounts for the masking properties of the human auditory system, while the source model accounts for the physical characteristics of the sound sources. In this embodiment, the two models are combined and provide a smoothing of G(ω) over time and frequency. The smoothing over time is achieved as follows, $$G_\tau'(\omega)=(1-\gamma(\omega)) \cdot G_{\tau-1}'(\omega)+\gamma(\omega) \cdot G_\tau(\omega)$$

where τ indicates the current time frame of the process. γ(ω) determines for each frequency band the amount of smoothing that is applied to $G_\tau(\omega)$ over time. It will be appreciated that the values of γ(ω) can vary with frequency. The values of γ(ω) may also change over time and they may be dependent upon the various input signals, or upon the value of $G_\tau(\omega)$.

The simultaneous masking properties of the human auditory system can be viewed as a form of smoothing or spreading of energy over frequency. In this embodiment, the simultaneous masking is computed as follows, $$\text{Masking}(\omega)=\text{spread1}(\omega) \cdot G_\tau'(\omega)+\text{spread2}(\omega) \cdot \text{Masking}(\omega-1).$$

The variables spread1(.omega.) and spread2(.omega.) determine the amount of simultaneous masking across frequency. In this embodiment, spread1(.omega.) and spread2 (.omega.) are designed to account for the fact that the bandwidths of the auditory filters increase with increasing frequency, and so more spreading is applied at higher frequencies.

The gain estimate is refined by adding the effects of the estimated masking. The parameter μ(ω) determines the level at which the masking estimate is added to the previously computed gain values $G_\tau'(\omega)$.

$$G_\tau''(\omega)=G_\tau'(\omega)+\mu(\omega) \cdot \text{Masking}(\omega)$$

This step can cause the gain values $G_\tau''(\omega)$ to exceed 1.0. In this embodiment, the maximum gain values are limited to 1.0.

$$G_\tau''(\omega) = \begin{cases} 1.0; & G_\tau''(\omega) > 1.0 \\ G_\tau''(\omega); & \text{otherwise} \end{cases}$$

The adjustment frequency spectrum consists of the gain values $G_\tau''(\omega)$. The adjustment processor 25 applies the gain values $G_r''(\omega)$ to the Core($\omega$) 23 signal for each frequency band to form a first output signal spectrum Y($\omega$) 26.

$$Y(\omega)=G_r''(\omega)[Core_{(\omega)}]$$

A noise reduction process 31 is applied to Y($\omega$) to further reduce undesired sounds. This produces a frequency domain estimate of the desired signal $\tilde{S}(\omega)$ 34.

$$\tilde{S}(\omega)=\text{NoiseReduction}[Y(\omega)]$$

A spectral subtraction based noise reduction is employed in this embodiment. It will be appreciated that other methods may be employed. $\tilde{S}(\omega)$ is converted to the time domain to obtain the desired signal $\hat{s}(t)$ 35. In this embodiment the time to frequency converter 32 consists of a fast implementation of an Inverse Discrete Fourier Transform (IDFT) followed by a root-Hanning window 33.

$$\hat{s}(t)=\text{IDFT}[\tilde{S}(\omega)]$$

The controller 50 is operable to control and vary the parameters within the embodiment of the invention such that the performance of the invention is suitable for a given application.

This embodiment of the present invention used two microphones. It will be appreciated that more microphones can be used. When only two microphones are used the extraction process will necessarily be symmetric with respect to the axis passing through the two microphones. Additional microphones can be used to eliminate this symmetry as well as to produce more complex or more highly directional Null($\omega$), Ref($\omega$), and Core($\omega$) signals.

It will be appreciated that zero padding may be included in the time to frequency domain conversion to give more frequency bands upon which to operate, to improve the performance of the microphone pattern generator, and to reduce the audibility of any time-aliasing artifacts. It will also be appreciated that the number of time samples operated upon in a given processing frame may vary over time, and may depend upon the nature of the sound sources at that time.

In this embodiment the Ref($\omega$) 22 signal corresponds to the signal resulting from a cardioid microphone pattern facing the desired signal s(t). It will be appreciated that the Ref($\omega$) signal can be made to represent other microphone patterns, including an omnidirectional pattern. The peak of the pattern need not be directed toward the desired signal. It will also be appreciated that the pattern may be adaptive and may vary over frequency. It will also be appreciated that the pattern may vary over time.

In this embodiment, the Null($\omega$) 21 signal corresponds to the signal resulting from a cardioid microphone pattern with the null of the pattern directed toward the desired signal. It will be appreciated that the Null($\omega$) signal can be made to represent other microphone patterns, including an omnidirectional pattern. The null of the pattern need not be directed toward the desired signal.

In this embodiment, the Core($\omega$) 23 signal corresponds to a figure-of-eight microphone pattern. It will be appreciated that the Core ($\omega$) signal can be made to represent other microphone patterns, including an omnidirectional pattern.

It will be appreciated that the microphone patterns corresponding to the Ref($\omega$), Null($\omega$), and Core($\omega$) signals may be adaptive and may vary independently over time. It will also be appreciated that the microphone patterns may vary over frequency.

In this embodiment, the desired sound source 63 was assumed to be located in close proximity to the microphone array. It will be appreciated that embodiments of the present invention can be made to operate for situations where the desired sound source is not located in close proximity to the microphone array. It will also be appreciated that the present invention can be made to operate for situations where the undesired sound sources are located in close proximity to the microphone array. In these cases, the values of $P_{Null1}(\omega)$, $P_{Null2}(\omega)$, $P_{Ref1}(\omega)$, $P_{Ref2}(\omega)$, $P_{Core1}(\omega)$, and $P_{Core2}(\omega)$ would be altered accordingly.

It will be appreciated that $P_{Null1}(\omega)$, $P_{Null2}(\omega)$, $P_{Ref1}(\omega)$, $P_{Ref2}(\omega)$, $P_{Core1}(\omega)$, and $P_{Core2}(\omega)$ can represent complex impulse responses.

The spatial index measure used in this embodiment was motivated by the lateral energy fraction. It will be appreciated that other mathematical functions may be used to compute the spatial index measure. The mathematical function used to compute the spatial index measure may also be motivated by the reciprocal of the lateral energy fraction. The spatial index measure may include the microphone signals $M_1(\omega)$ and $M_2(\omega)$. The spatial index measure may include an distance measure based on the relative amplitudes of Ref($\omega$), Null($\omega$), $M_1(\omega)$, and $M_2(\omega)$ in order to selectively attenuate sound sources based on their relative distances to the microphone array.

In this embodiment, the spatial index measure was computed using a magnitude-squared representation, $|\bullet|^2$. It will be appreciated that the spatial index measure may be computed using other representations, $|\bullet|^p$, where p indicates some arbitrary exponent.

It will be appreciated that the spatial filter 27 can have any arbitrary form, and is not limited to the form described in this embodiment. The spatial filter may allow more than one range of spatial indices to pass unattenuated.

In this embodiment the perceptual model 29 was combined with the source model 28. It will be appreciated that the models need not be combined.

In this embodiment the perceptual model 29 was represented by a smoothing over time and frequency. It will be appreciated that other perceptual models may be employed (Tsoulakis, PEAQ standard, Johnston, MPEG standard, Dolby AC3).

In this embodiment the source model 28 was represented by a smoothing over time and frequency. It will be appreciated that other source models may be employed (Levine, Short, J. O. Smith, speech model). Levine, Scott N., A Switched Parametric and Transform Audio Coder, 1999, pp. 1-4, ICASSP, Phoenix, Ariz.

In FIG. 3 the noise reduction 31 is shown after the adjustment processor 25. It will be appreciated that the noise reduction processing can be done prior to the adjustment processor.

This embodiment describes a method for obtaining a single output signal corresponding to an estimate of a single sound source 63. It is understood that the present invention can be used to generate multiple output signals corresponding to different sound sources or groups of different sound sources.

What is claimed is:

1. A method of selectively extracting components of an input signal comprising the steps of:
   detecting audible sound with a plurality of microphones in at least first and second spaced locations;
   generating microphone signals representative of the audible sound in the first and second spaced locations with the microphones;
   sampling the microphone signals with a processor;
   deriving with the processor from the microphone signals a plurality of spectrum signals comprising a reference signal produced from a first directional pattern, a null signal produced from a second directional pattern and a core signal produced from a third directional pattern, each of the spectrum signals being derived independent of the other spectrum signals;

deriving an adjustment frequency spectrum with the processor from a spatial index derived from the null signal and the reference signal, the spatial index providing a measure of angle and distance of a plurality of sound sources from the microphones;

the processor either passing or attenuating a sound source based on a direction of arrival and a distance of the sound source from the microphones by application of the adjustment frequency spectrum signal to adjust the core signal; and the processor generating an output audio signal from the adjusted core signal.

2. A method as claimed in claim 1 including the step of transforming from time domain to frequency domain.

3. A method as claimed in claim 2 where the step of transforming occurs before the step of deriving the reference signal, the null signal and the core signal.

4. A method as claimed in claim 2 where the step of transforming occurs after the step of deriving the reference signal, the null signal and the core signal.

5. A method as claimed in claim 2 where the step of generating an audio output signal includes the step of transforming the adjusted core signal from the frequency domain to the time domain.

6. A method as claimed in claim 1 where the first directional pattern represents at least one cardioid microphone pattern facing a desired sound source.

7. A method as claimed in claim 6 where the second directional pattern represents at least one cardioid microphone pattern facing away from a desired sound source.

8. A method as claimed in claim 7 where the third directional pattern represents at least one figure-eight microphone pattern.

9. A method as claimed in claim 1 where the spatial index is representative of a relative location of a desired source and an undesired source of at least part of the audible sound.

10. A method as claimed in claim 1 where the step of deriving an adjustment frequency spectrum includes the step of smoothing the output audio signal by application of a perceptual model to minimize only those portions of undesired signals present in the output audio signal that are not masked by desired signals present in the output audio signal.

11. A method as claimed in claim 1 where the step of sampling uses a window.

12. A method as claimed in claim 11 where the step of sampling uses a Hanning window.

13. A method as claimed in claim 1 further comprising the step of reducing noise.

14. A method as claimed in claim 13 where the step of reducing noise occurs after the step of deriving the reference signal, the null signal and the core signal.

15. A method as claimed in claim 14 where the step of reducing noise is applied to the null signal and reference signal.

16. A method as claimed in claim 13 where the step of reducing noise occurs after application of the adjustment frequency spectrum.

17. A method as claimed in claim 16 wherein the step of reducing noise is applied to the core signal.

18. A method as claimed in claim 13 wherein the step of reducing noise includes one of spectral subtraction, adaptive cancellation and wavelet denoising.

19. An apparatus for selectively extracting components of an input signal comprising:

a processor configured to process first and second detected signals representative of detected audible sound in at least two spaced locations;

the processor further configured to derive a plurality of signals from the first and second detected signals, the signals comprising a reference signal produced from a first directional pattern, a null signal produced from a second directional pattern, and a core signal produced from a third directional pattern, where the reference signal, the null signal and the core signal are a plurality of spectrum signals, and each of the spectrum signals are derived without use of any other of the spectrum signals;

the processor further configured to derive an adjustment frequency spectrum from a spatial index derived from the null signal and the reference signal, the spatial index representing a relative spatial location of a desired sound source and an undesired sound source;

the processor further configured to apply the adjustment frequency spectrum signal to adjust the core signal by attenuation of the undesired sound source based on the relative spatial location; and the processor further configured to generate the desired audio signal from the adjusted core signal.

20. The apparatus of claim 19, where application of the adjustment frequency spectrum signal to adjust the core signal comprises the processor further configured to adjust frequency components of the core signal based on a direction of arrival and a distance of the undesired sound source represented within the detected audible sound.

21. The apparatus of claim 19, where application of the adjustment frequency spectrum signal is indicative of a dominate spatial location of the desired sound source and the undesired sound source for each of a plurality of frequency bands included in the detected audible sound.

22. An apparatus for selecting extracting components of an input signal comprising:

a plurality of microphones operable to detect an audio signal in a plurality of spaced locations;

a plurality of signal samplers configured to sample the audio signal;

a microphone pattern processor configured to independently derive a plurality of spectrum signals, the spectrum signals comprising: a reference signal derived from a first directional pattern of the sampled audio signal, a null signal derived from a second directional pattern of the sampled audio signal and a core signal derived from a third directional pattern of the sampled audio signal, each of the spectrum signals derived independent of the other spectrum signals;

an adjustment frequency spectrum generator configured to receive the null signal and the reference signal, the adjustment frequency spectrum generator configured to generate an adjustment frequency spectrum signal indicative of a relative location of desired and undesired sound sources;

an adjustment processor configured to apply the adjustment frequency spectrum signal to adjust the core signal, the core signal adjusted to maintain desired sound sources and attenuate undesired sound sources; and an audio signal regenerator configured to generate an output audio signal from the adjusted core signal.

23. A wireless device including the apparatus of claim 22.

24. The apparatus of claim 22, further comprising a plurality of microphones included in the at least two spaced locations, the microphones operable to generate the first and second detected signals based on the detected audible sound being sensed by the microphones.

25. The apparatus of claim 24, where the adjustment frequency spectrum is derived by the processor to pass or attenuate the sound source included as part of the detected audible sound based on a direction of arrival at the microphones and a distance from the microphones of the sound source.

26. The apparatus of claim 22, where the first directional pattern faces in a direction opposite to the second directional pattern.

27. The apparatus of claim 22, where the adjustment frequency spectrum comprises a spatial index measure for each of a plurality of frequency bands in a range of frequencies, the spatial index measure representative of a relative location of desired and undesired sound sources.

28. The apparatus of claim 22, where the adjustment frequency spectrum comprises spatial indices used by a filter having gain values for each of a plurality of respective frequency bands, the gain values applied to frequency components of the core signal in each of the respective frequency bands to pass or attenuate the sound source included as part of the detected audible sound.

29. A method as claimed in claim 1 where each of the first directional pattern, the second directional pattern, and the third directional pattern are different directional patterns.

30. The apparatus of claim 19, where the first directional pattern, the second directional pattern, and the third directional pattern each have different directional patterns of the first and second detected signals.

* * * * *